United States Patent
Jiang et al.

(10) Patent No.: US 7,090,826 B2
(45) Date of Patent: Aug. 15, 2006

(54) MONOLITH BASED CATALYTIC PARTIAL OXIDATION PROCESS FOR SYNGAS PRODUCTION

(75) Inventors: Weibin Jiang, New Providence, NJ (US); Seungdoo Park, North Brunswick, NJ (US); Mark S. Tomczak, Hillsborough, NJ (US); Divyanshu R. Acharya, Bridgewater, NJ (US); Satish S. Tamhankar, Scotch Plains, NJ (US); Ramakrishnan Ramachandran, Allendale, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 366 days.

(21) Appl. No.: 10/657,610

(22) Filed: Sep. 8, 2003

(65) Prior Publication Data

US 2004/0120888 A1   Jun. 24, 2004

Related U.S. Application Data

(60) Provisional application No. 60/436,074, filed on Dec. 23, 2002.

(51) Int. Cl.
*C01B 3/02* (2006.01)
*C01B 3/32* (2006.01)
*C01B 31/18* (2006.01)

(52) U.S. Cl. .................. 423/650; 423/418.2; 423/651; 252/373

(58) Field of Classification Search ................ 252/373; 423/650, 651, 418.2
See application file for complete search history.

(56) References Cited

U.S. PATENT DOCUMENTS

| 4,048,091 | A | 9/1977 | Barnaba |
| 4,492,769 | A | 1/1985 | Blanchard et al. |
| 4,522,894 | A | 6/1985 | Hwang et al. |
| 4,537,873 | A | 8/1985 | Kato et al. |
| 4,680,282 | A | 7/1987 | Blanchard et al. |
| 4,844,837 | A | 7/1989 | Heck et al. |
| 4,897,253 | A | 1/1990 | Jenkins |
| 4,927,799 | A | 5/1990 | Matsumoto et al. |
| 5,013,705 | A | 5/1991 | Koberstein et al. |
| 5,023,276 | A | 6/1991 | Yarrington et al. |

(Continued)

FOREIGN PATENT DOCUMENTS

EP      0 303 438 A2      2/1989

(Continued)

OTHER PUBLICATIONS

Sintered Ceria: A New Dense and Fine Grained Ceramic Material by J.F. Baumard, C. Gault and A. Argoitia; Journal of the Less-Common Metals, 127 (1987) 125-130.

(Continued)

*Primary Examiner*—Stanley S. Silverman
*Assistant Examiner*—Timothy C. Vanoy
(74) *Attorney, Agent, or Firm*—Philip H. Von Neida

(57) ABSTRACT

An improved process for the catalytic partial oxidation of hydrocarbons to produce hydrogen and carbon monoxide and less than ~2% carbon dioxide is disclosed. The process further permits the reaction to be initiated at room temperature, and utilizes a metal catalyst deposited on a ceria-coated zirconia monolith support, which exhibits high conversions of hydrocarbons to synthesis gas (hydrogen and carbon monoxide).

32 Claims, 3 Drawing Sheets

U.S. PATENT DOCUMENTS

| | | | |
|---|---|---|---|
| 5,232,889 | A | 8/1993 | Blanchard et al. |
| 5,368,835 | A | 11/1994 | Choudhary et al. |
| 5,431,855 | A | 7/1995 | Green et al. |
| 5,441,581 | A | 8/1995 | Van den Sype et al. |
| 5,500,149 | A | 3/1996 | Green et al. |
| 5,510,056 | A | 4/1996 | Jacobs et al. |
| 5,580,536 | A | 12/1996 | Yao et al. |
| 5,639,401 | A | 6/1997 | Jacobs et al. |
| 5,648,582 | A | 7/1997 | Schmidt et al. |
| 5,658,497 | A | 8/1997 | Kumar et al. |
| 5,785,774 | A | 7/1998 | Van Den Sype et al. |
| 5,856,585 | A | 1/1999 | Sanfilippo et al. |
| 5,883,138 | A | 3/1999 | Hershkowitz et al. |
| 5,965,481 | A | 10/1999 | Durand et al. |
| 5,976,721 | A | 11/1999 | Limaye |
| 6,051,162 | A | 4/2000 | Van den Sype et al. |
| 6,254,807 | B1 | 7/2001 | Schmidt et al. |
| 6,329,434 | B1 | 12/2001 | Wen et al. |
| 6,455,597 | B1 | 9/2002 | Hohn et al. |
| 6,458,334 | B1 | 10/2002 | Tamhankar et al. |
| 6,527,980 | B1 * | 3/2003 | Roden et al. ............... 252/373 |
| 6,733,692 | B1 * | 5/2004 | Dindi et al. ................. 252/373 |
| 6,887,455 | B1 * | 5/2005 | Carpenter et al. ....... 423/648.1 |
| 6,946,114 | B1 * | 9/2005 | Allison et al. .............. 423/651 |
| 2001/0041159 | A1 | 11/2001 | Tamhankar et al. |
| 2004/0052725 | A1 * | 3/2004 | Niu et al. ................... 423/651 |
| 2004/0191165 | A1 * | 9/2004 | Anzai et al. ................ 423/651 |
| 2005/0112047 | A1 * | 5/2005 | Allison et al. ........... 423/418.2 |

FOREIGN PATENT DOCUMENTS

| | | |
|---|---|---|
| EP | 0 524 643 A1 | 1/1993 |
| EP | 0 548 679 A1 | 6/1993 |
| EP | 0 640 561 A1 | 3/1995 |
| EP | 0 781 591 A2 | 7/1997 |
| EP | 1 134 188 A2 | 9/2001 |
| GB | 1399137 | 6/1975 |
| JP | 11-342334 A | 12/1999 |
| WO | WO 93/01130 | 1/1993 |
| WO | WO 98/35908 | 8/1998 |
| WO | WO 99/48805 | 9/1999 |

OTHER PUBLICATIONS

"A Comparative Study of Oxygen Storage Capacity Over $Ce_{0.6}Zr_{0.4}O_2$ Mixed Oxides Investigated by Temperature-Programmed Reduction and Dynamic OSC Measurements," Hickey et al., Catalysis Letters, vol. 72, No. 102, pp. 45-50 (2001).

"Effect of Ceria Structure on Oxygen Migration for Rh/Ceria Catalysts," by Cordatos et al., J. Phys. Chem., 100, 785-789 (1996).

"Tape Cast Solid Oxide Fuel Cells for the Direct Oxidation of Hydrocarbons," Park et al., Journal of the Electrochemical Society, 148 (5), pp. A443-A447 (2002).

"Catalytic Partial Oxidation of Methane to Synthesis Gas Over $Ni-CeO_2$," Zhu et al., Applied Catalysis A: General 208, pp. 403-417 (2001).

"Catalytic Partial-Oxidation of Methane on a Ceria-Supported Platinum Catalyst for Application in Fuel Cell Electric Vehicles," Pino et al., Applied Catalysis A: General 225, pp. 63-75 (2002).

K. Otsuka, T. Ushiyama and I. Yamanaka, "Partial Oxidation of Methane Using the Redox of Cerium Oxide," Chemistry Letters, pp. 1517-1520, 1993.

E.S. Putna, J. Stubenrauch, J.M. Vohs, and R. J. Gorte, "Ceria-Based Anodes for the Direct Oxidation of Methane in Solid Oxide Fuel Cells," LANGMUIR, vol. 11, No. 12, 1995, pp. 4832-4837.

* cited by examiner

MONOLITH BASED CATALYTIC PARTIAL OXIDATION PROCESS FOR SYNGAS PRODUCTION

This application claims priority from Provisional U.S. Patent Application 60/436,074 filed Dec. 23, 2002.

BACKGROUND OF THE INVENTION

The conversion of hydrocarbons to hydrogen and carbon monoxide containing gases is well known in the art. Examples of such processes include catalytic steam reforming, auto-thermal catalytic reforming, catalytic partial oxidation and non-catalytic partial oxidation. Each of these processes has advantages and disadvantages and produces various ratios of hydrogen and carbon monoxide, also known as synthesis gas. The present invention is directed to a catalytic partial oxidation process.

Partial oxidation processes are also well known and the art is replete with various catalytic partial oxidation processes. Partial oxidation is an exothermic reaction wherein a hydrocarbon gas, such as methane, and an oxygen-containing gas, such as air, is contacted with a catalyst at elevated temperatures to produce a reaction product containing high concentrations of hydrogen and carbon monoxide. The catalysts used in these processes are typically noble metals, such as platinum or rhodium, and other transition metals, such as nickel on a suitable support.

Partial oxidation processes convert hydrocarbon-containing gases, such as natural gas, to hydrogen, carbon monoxide and other trace components such as carbon dioxide and water. The process is typically carried out by injecting preheated hydrocarbons and an oxygen-containing gas into a combustion chamber where oxidation of the hydrocarbons occurs with less than stoichiometric amounts of oxygen for complete combustion. This reaction is conducted at very high temperatures, such as in excess of 700° C. and often in excess of 1,000° C., and pressures up to 150 atmospheres. In some reactions, steam or carbon dioxide can also be injected into the combustion chamber to modify the synthesis gas product and to adjust the ratio of hydrogen to carbon monoxide.

More recently, partial oxidation processes have been disclosed in which the hydrocarbon gas is contacted with the oxygen-containing gas at high space velocities in the presence of a catalyst such as a metal deposited on a ceramic foam (monolith) support. The monolith supports are impregnated with a noble metal such as platinum, palladium or rhodium, or other transition metals such as nickel, cobalt, chromium and the like. Typically, these monolith supports are prepared from solid refractory or ceramic materials such as alumina, zirconia, magnesia and the like. During operation of these reactions, the hydrocarbon feed gases and oxygen-containing gases are initially contacted with the metal catalyst at temperatures in excess of 400° C., typically in excess of 600° C., and at a standard gas hourly space velocity (GHSV) of over 100,000 per hour.

SUMMARY OF THE INVENTION

The present invention provides an improved process for the catalytic partial oxidation of hydrocarbons to produce hydrogen and carbon monoxide and less than ~2% carbon dioxide. Accordingly, the process permits the reaction to be initiated at room temperature, thereby reducing operating and capital costs. The inventive process employs a metal catalyst deposited on a ceria-coated zirconia monolith support, which exhibits high conversions of hydrocarbons to synthesis gas.

In one aspect, the invention provides a process for the partial oxidation of hydrocarbons to produce hydrogen and carbon monoxide comprising contacting a mixture of a hydrocarbon-containing feed gas and an oxygen-containing feed gas with a catalytically effective amount of a reduced metal catalyst consisting essentially of a transition metal selected from the group of nickel, cobalt, iron, platinum, palladium, iridium, rhenium, ruthenium, rhodium, osmium and combinations thereof, supported on or in a ceria-coated zirconia monolith support, at a pressure of between 1 and 20 atmospheres, a feed gas standard gas hourly space velocity of about 50,000 to about 500,000 per hour, and a linear velocity of about 0.2 to 2.0 meter per second (m/s).

In another aspect, this invention provides a process for the partial oxidation of hydrocarbons to produce hydrogen and carbon monoxide, which can be initiated at a temperature of about and above 10° C. by contacting the said catalyst with the feed mixture along with injection of a small amount of $H_2$. In another embodiment of the present invention, reaction can also be initiated at room temperature by adding a small amount of hydrogen to feed mixture in the presence of continuous CO2 flow in order to achieve a gradual increase in catalyst temperature to avoid thermal shock.

In a preferred embodiment the present invention provides for a method for producing carbon monoxide and hydrogen comprising contacting a hydrocarbon-containing gas and an oxygen-containing gas with a reduced metal catalyst supported by a ceria-coated zirconia monolith.

In another preferred embodiment, the present invention provides for a method for producing carbon monoxide and hydrogen comprising contacting a hydrocarbon-containing gas and an oxygen-containing gas in the presence of hydrogen gas with a reduced metal catalyst supported by a ceria-coated zirconia monolith.

An additional embodiment of the present invention is a reactor comprising a vessel, at least one ceramic foam disk impregnated with a catalytic material and at least one blank ceramic foam disk.

A further embodiment of the present invention is a method for producing carbon monoxide and hydrogen comprising contacting a hydrocarbon-containing gas, carbon dioxide, and an oxygen-containing gas with a reduced metal catalyst supported by a ceria-coated zirconia monolith.

In another embodiment of the present invention, hydrogen addition to the feed gas mixture of natural gas and oxygen is maintained at all times during the production of carbon monoxide and hydrogen to ensure that the catalyst remains in the reduced form.

DETAILED DESCRIPTION OF THE INVENTION

Figure 1:
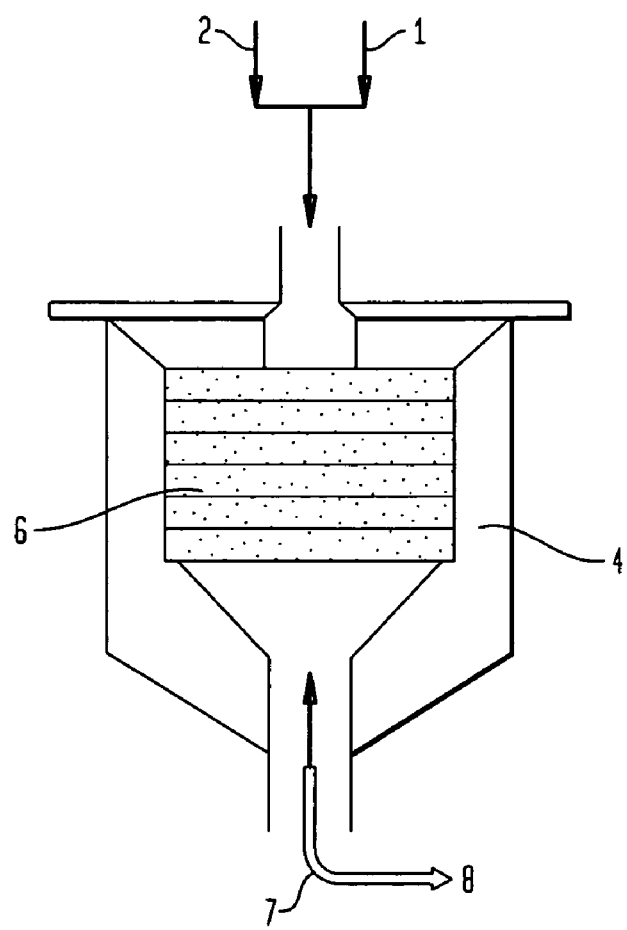
FIG. 1 is a schematic representation of a reactor that is employed in the present invention.

Natural gas and an oxygen-containing gas are mixed through lines 1 and 2 in a simple mixing device 3, with velocity exceeding the natural gas flame velocity so as to avoid flammability. The $C/O_2$ ratio in the mixture is in the range 1.5 to 2.0, preferably in the range 1.6 to 1.9. Optionally, steam or $CO_2$ is added to natural gas to adjust the $H_2/CO$ ratio in the product. Optionally, natural gas may be preheated by exchanging heat with the hot product stream or by other means so that the feed mixture temperature reaches about 80° C. or even higher. Since partial oxidation reaction is highly exothermic, the reactor is designed as a refractory-lined vessel 4 to achieve good thermal insulation. The monolith catalyst 6 is located at the bottom, carefully sealed with zirconia cement to prevent leakage of any unreacted feed gas. The top space is then filled with inert blank foam monolith disks 5 to improve the flow distribution and to avoid flammability. A gas distribution means such as a stainless steel distribution plate may be placed between the blank ceramic foam monoliths.

One key aspect of the invention is that the partial oxidation reaction is carried out at pressures in the range of about 1.0 bar to about 10.0 bar and preferably about 1.5 bar to about 3.0 bar. By employing this pressure range, carbon formation is completely avoided and addition of steam to prevent carbon formation is not necessary as would be the case for high pressure operation. The main benefit of running the reaction without steam is that the syngas produced has 2:1 $H_2$ to CO ratio which is critical for many applications of syngas. Since the reaction is at comparatively lower pressure, the product syngas is compressed to the desired pressure after cooling.

The metal catalysts employed in the present invention consist of a ceramic monolith support structure composed of ceria coated on zirconia substrate and coated or impregnated with a transition metal or combinations thereof. As used herein, "metal catalyst" refers to the entire catalyst structure including the metal and the monolith support. The monolith support is generally a ceramic foam-like structure formed from a single structural unit wherein the passages are disposed in either an irregular or regular pattern with spacing between adjacent passages. The single structural unit is used in place of conventional particulate or granular catalysts, which are less desirable in the present process. Examples of such irregularly patterned monolith supports include filters used for molten metals. Examples of regularly patterned supports include monolith honeycomb supports used for purifying exhausts from motor vehicles and used in various chemical processes. Preferred are the ceramic foam structures having irregular passages. Both types of monolith supports are well known and commercially available.

The catalyst element consists of a ceramic foam monolith composed substantially of zirconia, coated with about 15~20 wt. % ceria providing surface area for the metal impregnation, and contains 0.5~5 wt. % noble metal, preferably rhodium in metallic form, more preferably about 2 wt. % Rh. Optionally, a transition metal, such as Ni at 2~4 wt. % may be used by itself or in combination with Rh. The reactor contains several ceramic foam disks including those with catalyst impregnated on them and the remaining blanks to fill the void space. The blanks can be made of alumina, zirconia, cordierite or mixtures thereof. The impregnated metal (Rh), synergistically with ceria, acts as catalyst for the partial oxidation process. The disks with catalyst have porosity in the range 40 to 70 pores per inch (ppi) to maximize catalyst loading. On the other hand, blank disks have a relatively high porosity 20 to 40 ppi in order to keep the pressure drop low. The dimensions, i.e. diameter and height, are selected to meet two criteria, namely feed gas space velocity in the range of about 50,000~500,000 per hour (expressed as hourly standard volumetric feed flow rate per unit volume of the catalytic monolith), and linear velocity on a similar basis (standard conditions) of about 0.2 to 2 m/s.

On the catalyst surface hydrocarbons and oxygen in the feed mixture react rapidly to produce $H_2$ and CO, along with traces of $CO_2$ and $H_2O$ and unreacted methane, as well as heat due to the exothermic nature of the reaction. The hot synthesis gas ($H_2$+CO) 8 is quickly cooled by quenching water 7 to produce steam and to prevent carbon formation. The reactor design shown in FIG. 1 includes a quench system which allows cooling of syngas as it exits the monolith catalyst. The quenching system is designed to permit several modes of operation. For example, Minimum quench mode allows maximum heat recovery from syngas by quenching the syngas to a temperature which reduces carbon formation tendency.

Maximum quench mode allows syngas to be cooled down to 100 to 150° C. which represents a low capital cost solution if heat recovery is not desired.

Partial quench mode allows the syngas to be cooled down to temperatures suitable for downstream processing, e.g. water-gas shift reaction to convert majority of the CO to $H_2$.

As mentioned above, the metal catalyst is a singular unit of varying dimensions depending on the size and design of the reactor. In a preferred embodiment, the reactor is a pipe or tube of suitable material and construction having a diameter of between about 1 and 100 inches. The feed gas mixture is fed into one end and the partial oxidation reaction occurs on the metal catalyst with the product gas exiting from the other end. The metal catalyst can also be comprised of multiple monolith units to form an assembly of units disposed in end-to-end arrangements. It is preferred that the metal catalyst has porosity and orientation, which minimize the pressure drop of the feed gas through the catalyst. Moreover, multiple individual reactors can be used to form an assembly of reactors disposed in a side-by-side arrangement for increased production. For example, multiple pipes or tubes can be packed together as an assembly to form a single reactor unit with each individual pipe containing the metal catalyst.

A significant drawback of all of the earlier partial oxidation processes is that they require an external source of heat to initiate the partial oxidation reaction, or require a separate pre-heat step involving a chemical reaction. As stated above, the partial oxidation reaction is exothermic and once the reaction is started, the heat of the reaction will maintain the elevated temperature without the addition of external heat energy. However, since the process requires temperatures in excess of 400° C. to start or initiate the reaction, an external heat source or other means are still required. Of course, this requires additional capital costs and adds engineering complexities to the process thereby reducing its commercial attractiveness. To attempt to address this issue, some prior art processes have employed special initiating compounds to decrease the initiation temperature. For example, U.S. Pat.

No. 4,879,253 discloses the use of methanol as an initiating compound to reduce the initiating temperature in the range of 100° to 500° C. U.S. Pat. No. 6,458,334 B1 discloses the use of ceria-based monolith support to lower the initiation temperature to as low as ~100° C., without the addition of any initiation compound.

The present invention provides an improved partial oxidation process in which the initiation temperature can be as low as about 10° C. The present process eliminates the need for an external heat source or a separate pre-heat step to initiate the reaction thereby increasing the commercial attractiveness of the process. The inventive process involves controlled addition of hydrogen in the feed mixture while maintaining a proper sequence of introducing the various gas components in the feed mixture to achieve room temperature startup of this invention.

Furthermore it was discovered that the startup at room temperature (above 10° C.) using small amount of $H_2$ is possible only with the use of ceria-coating on the base monolith support, including metal and ceramic monoliths such as stainless steel, zirconia, titania etc. Tests show that room temperature start up is impossible using small amount of $H_2$ with, for example, a zirconia supported catalyst, without ceria coating, as described in Example 1. The preferred operating procedure of the inventive process is as described below:

1. Natural gas is first introduced at the desired flow rate.
2. Once the natural gas flow reaches its desired set point, hydrogen injection begins. This is critical from safety point of view and to maintain natural gas rich conditions before oxygen is added.
3. Oxygen flow is then started.
4. The $H_2$ flow, typically about 0.5 to 4% of the total flow, is maintained for 10 to 30 seconds.
5. Startup of the reaction is indicated by the rapid increase in the catalyst temperature to >400° C. The startup can occur before the oxygen flow has reached its set point demonstrating that only a short injection time of hydrogen is necessary.

It must be emphasized here that injection of hydrogen is not an additional step. In reality, hydrogen injection takes place between the introduction of natural gas and oxygen flows. For example, if hydrogen injection is not desired then there is no change in the way natural gas and oxygen are mixed and introduced to the reactor.

Figure 4:
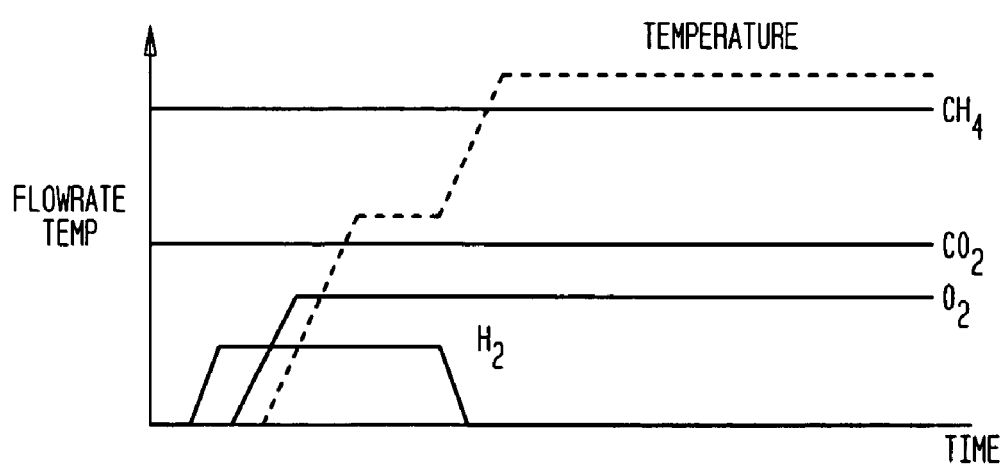
FIG. 4 is a schematic representation of a graph of flowrate and temperature versus time for a start-up procedure while employing injection of hydrogen with continuous carbon dioxide flow in the feed mixture.

Furthermore, the startup at room temperature is also possible with continuous flow of CO2 as reactant in the feed mixture. Shown as FIG. 4, The preferred operating procedure of the inventive process is as described below:

1. Natural gas and carbon dioxide are first introduced at the desired flow rate
2. Once the natural gas and carbon dioxide flows reach their desired set points, hydrogen injection begins.
3. Oxygen flow is then started.
4. The $H_2$ flow, typically about 0.5 to 4% of the total flow, is maintained for 10 to 30 seconds.
5. Startup of the reaction is indicated by the rapid increase in the catalyst temperature to >400° C.

It should be pointed out that addition of CO2 effectively controls the front temperature of catalyst as well as controls the heat-up rate of the catalyst bed. Therefore the initial thermal shock on monolith catalyst can be avoided through this method.

Alternatively, the present invention provides for a process whereby hydrogen is continually fed to the feed gas mixture of natural gas and oxygen. To maintain optimum efficiency in the process, the monolith catalyst needs to be in a reduced state. During startups, shutdowns and upset conditions, the monolith catalyst can become exposed to oxygen which can deactivate the monolith catalyst, particularly when the catalyst is hot. By ensuring a continuous feed of hydrogen to the gas feed mixture, the monolith catalyst remains in the reduced form and maintains its catalytic activity.

The present invention provides for two methods by which hydrogen is continuously fed to the feed gas mixture. The first uses a hydrogen-rich stream which exits either from the carbon monoxide pressure swing adsorption unit or cold box. The second method utilizes product syngas after heat recovery and cooling.

Figure 2:
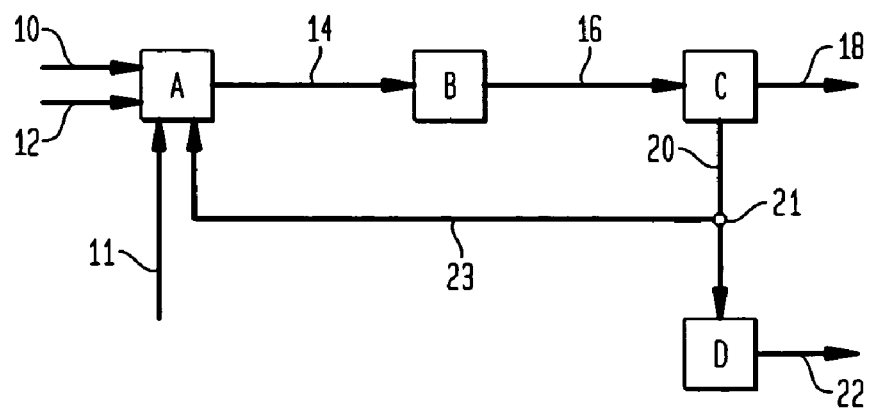
FIG. 2 is a schematic representation of a process for producing carbon monoxide and hydrogen while employing continual addition of hydrogen to the feed gases.

As described in FIG. 2, a schematic process for the production of hydrogen and carbon monoxide is depicted. Lines 10 and 12 connect to feed mixer A and deliver oxygen and natural gas respectively. Line 11 delivers hydrogen to the feed mixer A and is used in the embodiments of the invention where hydrogen is injected during the startup process.

Line 14 exits the feed mixer A and delivers oxygen, hydrogen and natural gas to the monolith reactor B where the monolith catalyst is housed. The monolith catalyst is the ceramic monolith support structure composed of ceria coated on zirconia substrate and coated or impregnated with a transition metal or combinations thereof. The partial oxidation process occurs therein and the resulting product gas stream, primarily carbon monoxide and hydrogen, are delivered through line 16 to the cold box or carbon monoxide pressure swing adsorption unit C whereby carbon monoxide is separated from the product gas stream. Product carbon monoxide leaves via line 18 and the remaining portion of the product gas leaves through line 20 to hydrogen pressure swing adsorption unit D where hydrogen is separated from the product gas and leaves via line 22.

In the inventive embodiment for using hydrogen recycle depicted here, the product gas exiting the cold box or carbon monoxide pressure swing adsorption unit C is hydrogen rich and part of this stream is diverted at valve 21 and directed along line 23 to the feed mixer A. This flow of hydrogen-rich gas can be continuously diverted from the cold box or carbon monoxide pressure swing adsorption unit C during the production process, thereby achieving a steady state whereby hydrogen is continuously present in the feed gas mix.

Figure 3:
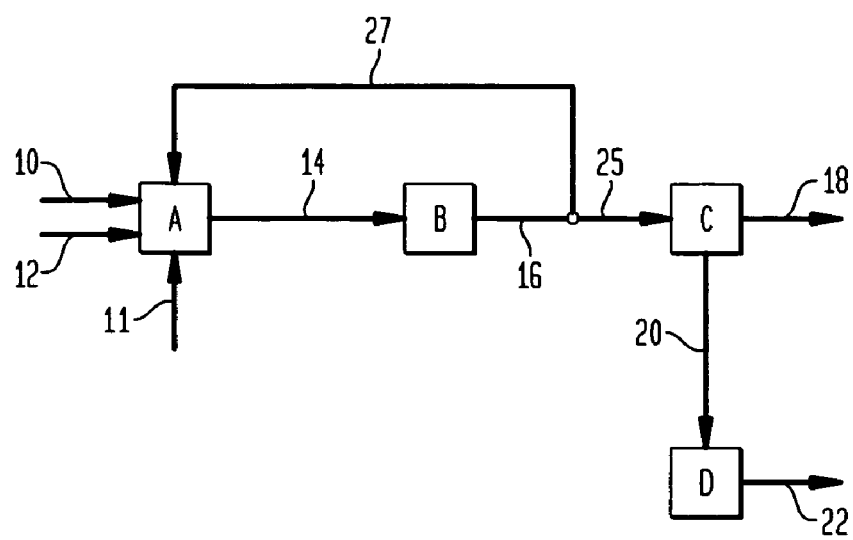
FIG. 3 is a schematic representation of a process for producing carbon monoxide and hydrogen while employing continual addition of hydrogen to the feed gases.

Alternatively as depicted in FIG. 3, rather than having valve 21 divert hydrogen-rich gas through line 23 to the feed mixer A, a valve 25 is placed in line16. This valve connects with line 27 which connects to feed mixer A. This embodiment diverts product gas, containing primarily carbon monoxide and hydrogen, through valve 25 and line 27, back to the feed mixer A whereby hydrogen will continuously mix with the feed gas as long as the partial oxidation is occurring. This also achieves a steady state presence of hydrogen in the feed gas mixture.

U.S. Pat. No.6,458,334 B1 teaches the use a mixture of air and a small amount of $H_2$, introduced at a gas hourly space velocity of 4000 to 10,000 per hour, to achieve heating of the catalyst as well as its reduction in a separate step prior to starting the process feed flow. U.S. Pat. No. 6,329,434 B1 discloses a method to initiate the partial oxidation process by first introducing a $H_2/O_2$ mixture with or without a diluent, which is pre-heated preferably to 50 to 300° C. The mixture reacts on the catalyst and raises the catalyst temperature to a temperature at which hydrocarbon-oxygen partial oxidation reaction can be initiated.

The method of the present invention is unique in that the hydrocarbon-oxygen mixture is fed to the reactor at room temperature, and a small amount of $H_2$ is injected for a short time to initiate the partial oxidation reaction. We have also found that injection of hydrogen on its own is not enough to achieve room temperature start-up. The room temperature start-up can only be achieved by hydrogen injection combined with correct sequence of introducing natural gas and oxygen. Startup at room temperature (above 10° C.) using a small amount of $H_2$ is possible primarily by the use of ceria-coating on the base monolith support, including metal and ceramic monoliths such as stainless steel, zirconia, titania etc. Furthermore, the timing, amount and ensuring safety are critical parts of hydrogen injection as practiced in this invention. Thus, a further improvement is achieved in the startup procedure.

To shut down the reactor, $N_2$ flow is first started through the reactor, $O_2$ in the feed is then turned off, and the natural gas flow is turned off last. Proper care is taken to ascertain that no flammable or carbon formation conditions exist within the system. It is important to make sure that oxygen is not present in the reactor when there is no natural gas flow during shut-down in order to prevent oxidation of the catalyst which, if occurs, will deactivate the catalyst.

Another embodiment of the present invention is a process for the partial oxidation of hydrocarbons such as methane (natural gas) by contacting a feed containing the hydrocarbon, $O_2$ and $CO_2$ through a catalyst comprising rhodium supported on a ceria-coated monolith. The presence of $CO_2$ leads to convert some product $H_2$ from partial oxidation reaction to CO. Such a reaction will significantly increase CO production. Addition of $CO_2$ also increases the operating window for partial oxidation in terms of flammability. The conversion of $CO_2$ can be further improved by preheating the feed mixture to a higher temperature. It was found that addition of up to about 30 volume % $CO_2$ causes no significant deterioration in performance, and indeed, about 30% conversion of $CO_2$ is achieved in the short contact time reactor of this invention. The key aspect again is the low-pressure operation, which helps prevent carbon formation under these conditions.

It has also been observed that, when using the inventive process, the conversion of methane to hydrogen and carbon monoxide depends on both, space velocity and linear velocity at a fixed carbon to oxygen ratio in the feed. Most importantly, multiple layers of catalyst monoliths not only allow higher throughput capability at the same space velocity but also give better methane conversion at the same linear velocity. Example 2 illustrates the effect of layers of monoliths on the process performance.

The following examples illustrate the improved partial oxidation process of the present invention.

EXAMPLE 1

A zirconia monolith having 45 pores per inch, 0.7 inch in diameter and 0.39 inch long, was first coated with 20 wt. % ceria and then impregnated with 2% by weight of rhodium metal to prepare the metal catalyst. Detailed preparation method can be found in co-pending U.S. patent application Ser. No. 10/143,705. The reactor containing the metal catalyst monolith was purged with nitrogen gas at 10° C. for 60 minutes.

Methane was first introduced at a flow rate of 8.8 slpm. A small amount of $H_2$ (0.5 slpm) was injected into the methane line for up to 30 seconds. At the same time, $O_2$ flow was started and adjusted to obtain the desired $C/O_2$ ratio of 1.75. Startup of the reaction was indicated by the rapid increase in the catalyst temperature to >800° C. within a few seconds with the production of hydrogen and carbon monoxide. Therefore only about 4% $H_2$ in feed mixture is required for only 30 seconds to start up the partial oxidation of methane.

COMPARATIVE EXAMPLE A

A metal catalyst was prepared as described in Example 1. The same amount of rhodium metal was loaded on the ceria-coated zirconia support.

A premixed gas mixture containing methane (8.8 slpm), oxygen (5.0 slpm) and hydrogen (0.5 slpm) was passed into the reactor containing the metal catalyst at 10° C. The reaction could not be initiated until hydrogen amount was increased to 22 mol % (3 slpm). This shows the importance of the sequence of addition of different gases in the feed mixture.

COMPARATIVE EXAMPLE B

A metal catalyst was prepared as described in Example 1, except that the monolith support was made of zirconia. The same amount of rhodium metal was loaded on the zirconia support, without any ceria coating as described in Example 1.

When attempting to start the reaction by following the procedures described in Example 1 using hydrogen injection, the reaction could not be initiated until a temperature of about 150° C. was reached. This clearly shows the synergistic role played by ceria.

EXAMPLE 2

To compare the effect of linear velocity and space velocity, monolith catalysts, as described in Example 1, of two different diameters (0.7" and 1") were used. To compare results on the same catalyst volume basis, data with four stacked catalyst disks of 0.7" diameter×0.39" thickness are compared to those with two 1"×0.39" monolith catalysts. A feed mixture containing 64% methane and 36% oxygen was passed through the reactor, following the same start up procedure as in Example 1. Here space velocity is defined as total feed gas flow rate divided by the catalytic monolith volume and linear velocity is defined as total feed gas flow rate divided by the cross-sectional area of the catalytic monolith. Table 1 shows that, for the same space velocity and at the same reaction conditions, increasing linear velocity will increase methane conversion with better $H_2$ and CO selectivity. On the other hand, for the same linear velocity, lower space velocity results in better methane conversion and appreciably less methane slip. In other words, increasing L/D aspect ratio of catalytic monolith improved performance of partial oxidation reaction.

TABLE 1

| 2% Rh on 20% CeO2 coated ZrO2 monolith | Space Velocity (1/hr) | Linear Velocity (m/s) | Conversion % CH4 | Selectivity % H2 | CO |
|---|---|---|---|---|---|
| 4 × 0.7" × 0.39" | 86036 | 0.87 | 97.8 | 95.8 | 93.9 |
| 2 × 1" × 0.39" | 85810 | 0.47 | 97.0 | 96.0 | 92.0 |
| 2 × 1" × 0.39" | 158464 | 0.87 | 95.6 | 95.0 | 93.2 |
| 4 × 0.7" × 0.39" | 138817 | 1.40 | 99.0 | 96.7 | 93.7 |
| 2 × 1" × 0.39" | 138731 | 0.76 | 97.2 | 95.3 | 93.2 |

EXAMPLE 3

Figure 5A:
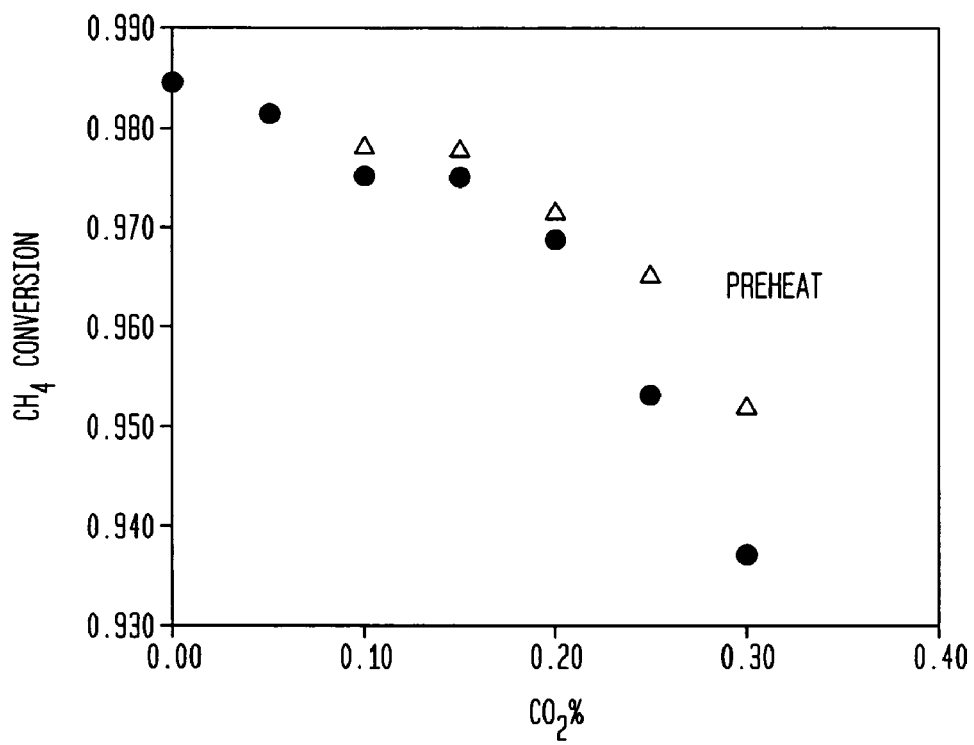
FIG. 5A is a graph detailing methane conversion versus percentage carbon dioxide in feed.
Figure 5B:
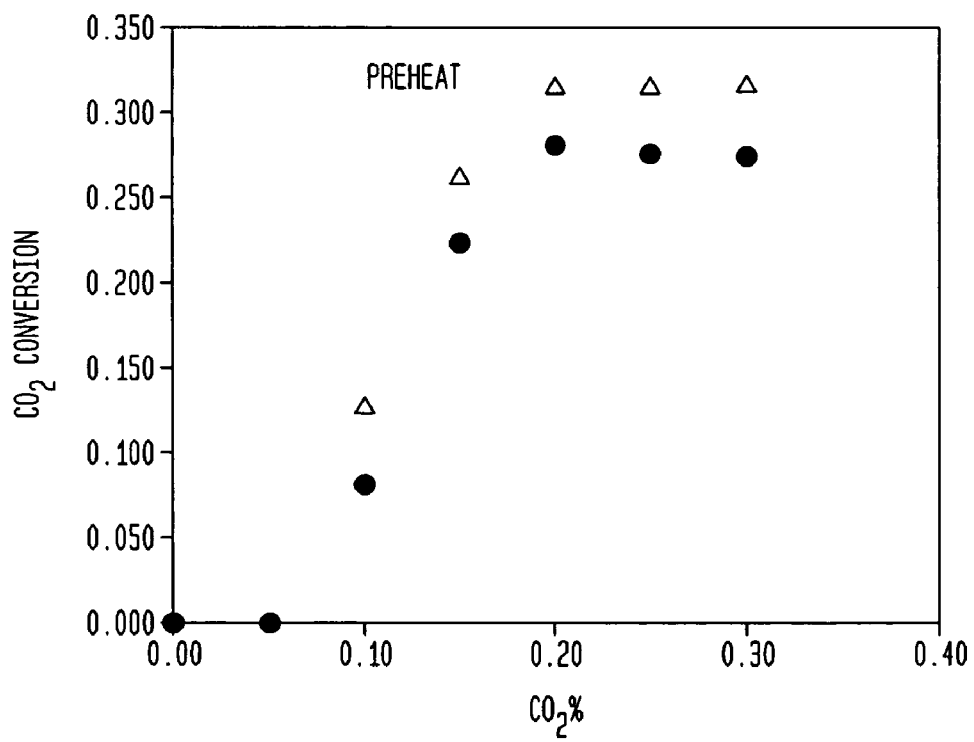
FIG. 5B is a graph detailing carbon dioxide conversion versus percentage carbon dioxide in feed.

A partial oxidation reaction was initiated following the same procedure as described in Example 1 with the same metal catalyst, which was used in Example 1. A gaseous mixture containing methane and oxygen at carbon to oxygen ratio of 1.75 and between 0 to about 30% by volume of carbon dioxide was then fed to the reactor containing the monolith catalyst. This mixture was different from the mixture which was used to initiate the reaction. This feed mixture was fed at a space velocity of 150,000 hr$^{-1}$. The reaction temperature decreased from 1020° to 750° C. due to endothermic reverse gas shift reaction. The typical product gas contained 39% hydrogen, 33% carbon monoxide, 13.1% carbon dioxide, 1.3% methane and 12.6% water. The conversion rate of methane and carbon dioxide were calculated from the measured concentrations in the product. The results are shown in FIGS. 5a and 5b below. When feed gas mixture was preheated to 300° C., there is a slight increase in both $CH_4$ and $CO_2$ conversion. The conversion measurements were calculated through element material balance While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for the partial oxidation of hydrocarbons in a reactor to produce hydrogen and carbon monoxide comprising initiating said partial oxidation at a temperature as low as about 10° C. or higher by the sequential steps of feeding natural gas into said reactor, injecting hydrogen into said reactor and feeding an oxygen-containing gas into said reactor, wherein said natural gas and said oxygen-containing gas contact a reduced metal catalyst consisting essentially of a transition metal selected from the group consisting of nickel, cobalt, iron, platinum, palladium, iridium, rhenium, ruthenium, rhodium, osmium and combinations thereof supported on or in a ceria-coated zirconia monolith support.

2. The method as claimed in claim 1 wherein said hydrogen is injected into said feed gas mixture.

3. The method as claimed in claim 2 wherein said hydrogen is injected between the addition of said hydrocarbon-containing feed gas and said oxygen-containing feed gas.

4. The method as claimed in claim 2 wherein the injection flow of said hydrogen is for about 10 to about 30 seconds.

5. The method as claimed in claim 1 wherein said temperature is greater than 10° C. and less than 100° C.

6. The method as claimed in claim 1 wherein said ceria-coated zirconia monolith support is about 5% to about 30% ceria by weight.

7. The method as claimed in claim 6 wherein said hydrogen is present in an amount of about 0.5 to about 4.0 percent by volume of the total flow of said feed gas.

8. The method as claimed in claim 1 wherein said hydrogen is obtained from the product hydrogen.

9. The method as claimed in claim 1 wherein said feed gas is at a pressure of between 1 and 20 atmospheres.

10. The method as claimed in claim 1 wherein said feed gas has a standard gas hourly space velocity of about 50,000 to about 500,000 per hour.

11. The method as claimed in claim 1 wherein said feed gas has a linear velocity of about 0.2 to about 2.0 meters per second.

12. A method for the partial oxidation of hydrocarbons in a reactor to produce hydrogen and carbon monoxide comprising initiating said partial oxidation at a temperature as low as about 10° C. by the sequential steps of feeding natural gas into said reactor, injecting a continuous stream of hydrogen into said reactor, and feeding an oxygen-containing gas into said reactor, wherein said natural gas and said oxygen-containing gas contact a reduced metal catalyst consisting essentially of a transition metal selected from the group consisting of nickel, cobalt, iron, platinum, palladium, iridium, rhenium, ruthenium, rhodium, osmium and combinations thereof supported on or in a ceria-coated zirconia monolith support.

13. The method as claimed in claim 12 further comprising adding a continuous flow of carbon dioxide to said feed gas.

14. The method as claimed in claim 12 wherein said hydrogen is injected into said feed gas mixture.

15. The method as claimed in claim 14 wherein said hydrogen is present in an amount of about 0.5 to about 4.0 percent by volume of the total flow of said feed gas.

16. The method as claimed in claim 12 wherein said temperature is greater than 10° C. and less than 100° C.

17. The method as claimed in claim 12 wherein said ceria-coated zirconia monolith support is about 5% to about 30% ceria by weight.

18. The method as claimed in claim 12 wherein said hydrogen is obtained from the product hydrogen.

19. The method as claimed in claim 12 wherein said feed gas is at a pressure of between 1 and 20 atmospheres.

20. The method as claimed in claim 12 wherein said feed gas has a standard gas hourly space velocity of about 50,000 to about 500,000 per hour.

21. The method as claimed in claim 12 wherein said feed gas has a linear velocity of about 0.2 to about 2.0 meters per second.

22. A method for the partial oxidation of hydrocarbons in a reactor to produce hydrogen and carbon monoxide by the steps of feeding natural gas, an oxygen-containing gas into said reactor, and carbon dioxide into said reactor, wherein said natural gas, said oxygen-containing gas and said carbon dioxide contact a rhodium catalyst supported on or in a ceria-coated zirconia monolith support.

23. The method as claimed in claim 22 wherein said carbon dioxide is present in said feed gas mixture in amounts up to about 80% by volume.

24. The method as claimed in claim 22 wherein said feed gas is at a pressure of between 1 and 20 atmospheres.

25. The method as claimed in claim 22 wherein said feed gas has a standard gas hourly space velocity of about 50,000 to about 500,000 per hour.

26. The method as claimed in claim 22 wherein said feed gas has a linear velocity of about 0.2 to about 2.0 meters per second.

27. The method as claimed 22 wherein said ceria-coated zirconia monolith support is about 5% to about 30% ceria by weight.

28. A method for the partial oxidation of hydrocarbons in a reactor to produce hydrogen and carbon monoxide comprising the sequential steps of feeding natural gas into said reactor, injecting hydrogen at a pressure of about 1.0 bar to about 10.0 bar into said reactor, and feeding an oxygen-containing gas into said reactor thereby contacting a reduced metal catalyst consisting essentially of a transition metal selected from the group consisting of nickel, cobalt, iron, platinum, palladium, iridium, rhenium, ruthenium, rhodium, osmium and combinations thereof supported on or in a ceria-coated zirconia monolith.

29. The method as claimed in claim 28 wherein said pressure is about 1.5 bar to about 3.0 bar.

30. The method as claimed in claim 28 where the ratio of hydrogen to carbon monoxide produced by said partial oxidation is about 2:1 hydrogen to carbon monoxide.

31. The method as claimed in claim 28 wherein said ceria-coated zirconia monolith support is about 5% to about 30% ceria by weight.

32. The method as claimed in claim 28 wherein said transition metal is rhodium.

* * * * *